Patented June 16, 1953

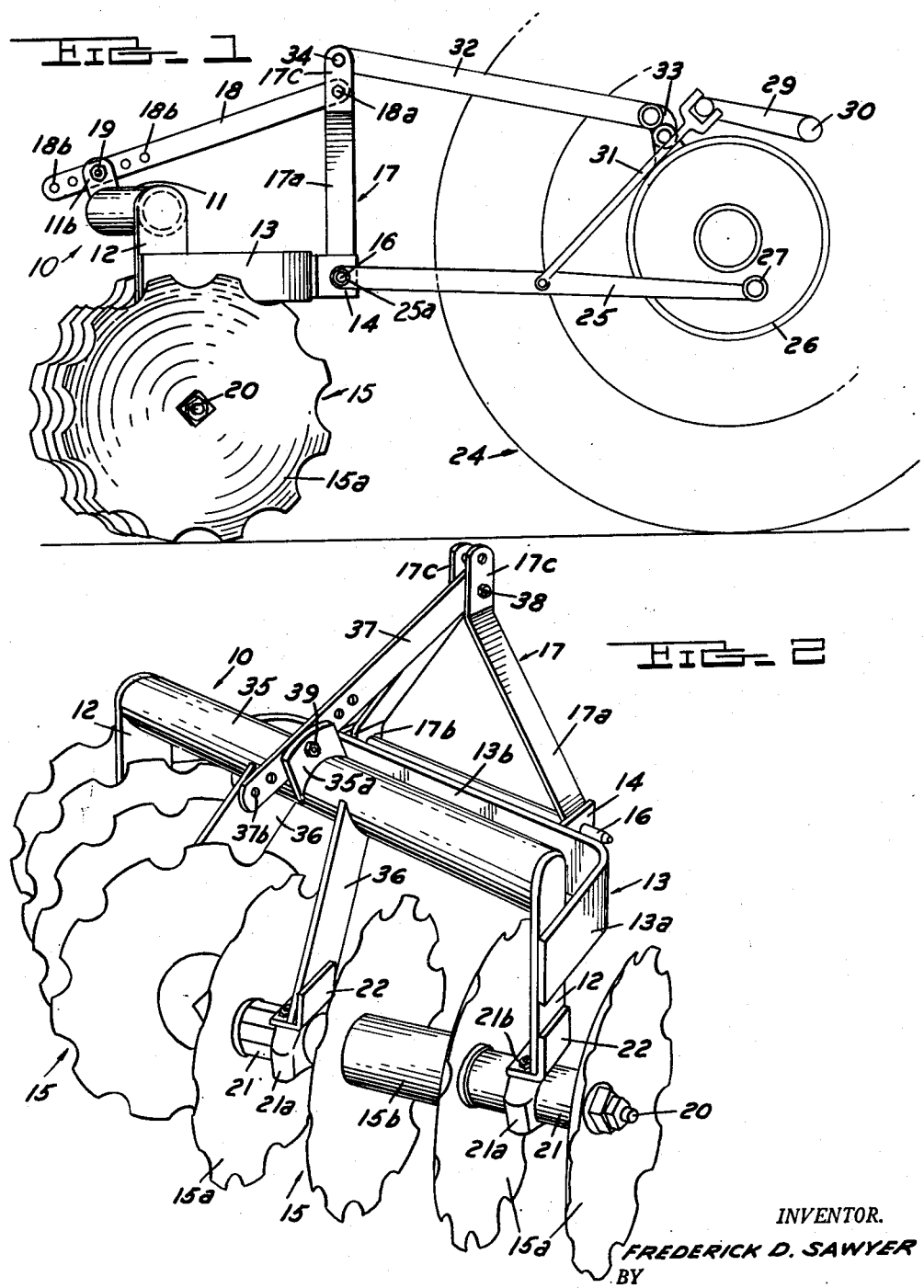

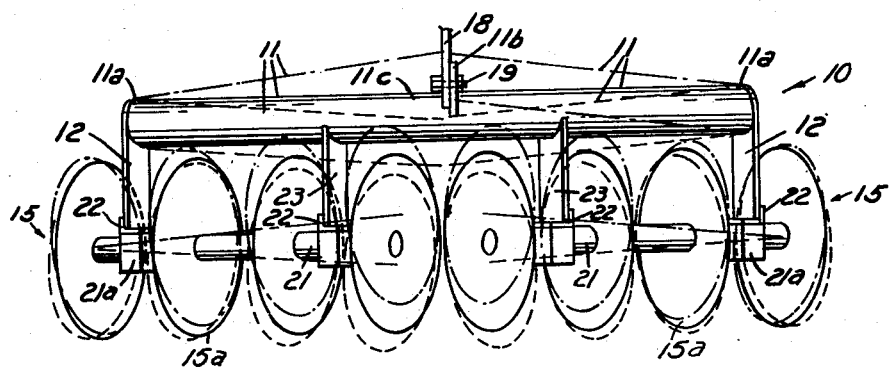
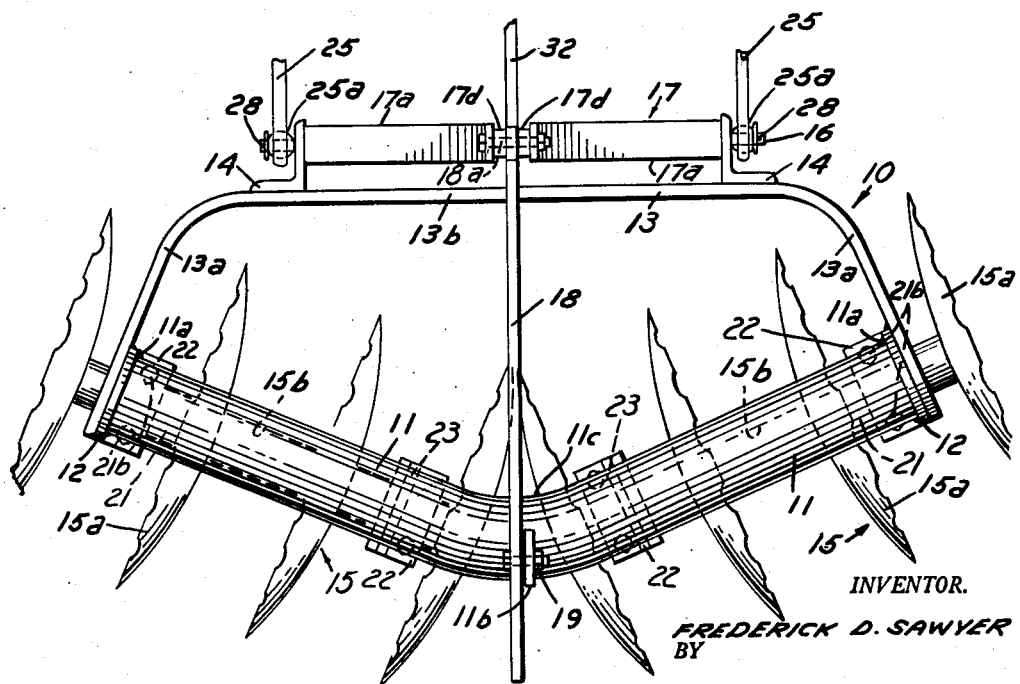
INVENTOR.
FREDERICK D. SAWYER

2,641,884

UNITED STATES PATENT OFFICE 2,641,884

BUSH AND BOG HARROW

Frederick D. Sawyer, Wayne, Mich., assignor to Dearborn Motors Corporation, Birmingham, Mich., a corporation of Delaware Application December 28, 1950, Serial No. 203,185

2 Claims. (Cl. 55—30)

This invention relates to disc harrows of the type usable with tractors having power-lifted trailing draft links, and more particularly to an improved frame construction for such harrows which will provide optimum weight distribution on the harrow gangs to insure ground penetration, and at the same time will greatly diminish the manufacturing costs of the harrow.

In many farming areas there has been a steadily increasing usage of a heavy type harrow which is commonly referred to as a bush and bog harrow. This type of harrow is characterized by having a very high weight loading per disc blade and generally notched disc blades are employed. This type of harrow is particularly useful in soils where penetration is difficult, such as the red clay soils commonly found in the southern regions of the United States, and also where a considerable crop or weed residue is encountered and the harrow must be relied upon to thoroughly cut up such crop or weed residue and mix such with the soil.

As indicated above, the main characteristic of the bush and bog harrow is a very high weight loading per disc blade. When the bush and bog harrow is constructed so as to be pulled by the ordinary drawbar of any tractor, there is obviously little difficulty encountered in so designing the harrow frame as to achieve the desired weight loading per blade. However, when it is desired to design a lift type disc harrow for use with well known types of tractors having power-lifted, trailing hitch links, a serious design limitation is immediately encountered in that the total weight of the harrow must not exceed a fixed figure which represents the maximum lifting capacity of the power-lifted hitch links of the tractor. For example, in the well known Ford tractor, the manufacturer's specifications set a limit of 800 lbs. as the maximum weight to be lifted by the tractor hitch links. Since the most desirable weight loading per blade of this type of harrow should approach 100 lbs., and since it has been customary to construct bush and bog harrows with two angularly disposed gangs each having at least four disc blades, it is very obvious that some sacrifice in blade loading must be made by the designer in order to conform to the maximum lifting ability of the tractor for which the particular harrow is designed. Accordingly, it becomes a matter of great importance to design the frame so that during the operation of the harrow, substantially all of the weight of the frame is effective as weight loading on the disc blades, or in other words, that a minimum amount of the over-all weight of the harrow, while operating, is carried by the tractor hitch links. Furthermore, in these days of high priced materials, it is equally important that the weight be built into the harrow by the use of the most economical materials and shapes that are available.

Accordingly, it is an object of this invention to provide an improved frame construction for a lift type harrow which will provide maximum utilization of the weight of the frame for blade loading purposes.

Another object of this invention is to provide an unusually simple yet rugged frame for a disc harrow which will permit a maximum weight loading of the disc harrow blades to be obtained at a minimum manufacturing cost.

Still another object of this invention is to provide an improved harrow construction of the bush and bog type wherein the disc gangs are rigidly supported while operating, yet can be readily adjusted in a vertical plane for varying the penetration characteristics of the harrow or for accomplishing a ditching or ridging action on the ground.

The specific nature of this invention, as well as other objects and advantages thereof, will become apparent to those skilled in the art from the following detailed description, taken in conjunction with the attached sheets of drawings on which, by way of preferred example only, are illustrated two embodiments of this invention.

On the drawings:

Fig. 1 is a side elevational view of a preferred modification of the improved disc harrow showing the disc harrow constructed in accordance with this invention mounted on the trailing draft links of a tractor of well known make.

Fig. 2 is a perspective view showing a modified form of the improved disc harrow.

Fig. 3 is a rear elevational view of the harrow shown in Fig. 1 illustrating in dotted outline the position of the disc gangs for ridging and ditching.

Fig. 4 is a plan view of Fig. 1.

As shown on the drawings:

As indicated above, the primary objective of this invention is the provision of a frame design for a bush and bog type harrow which will incorporate a maximum weight loading of each of the disc blades at a minimum cost. All disc harrow designers will agree that the most effective location of weight on the disc harrow so far as disc blade unit loading is concerned is adjacent the axle of the disc gangs. Hence, weight may be added by the utilization of massive bearings which support the disc gang shaft and equally massive spacers which space the individual discs on the gang shaft. However, this is an expensive way of increasing the unit blade loading for it necessarily requires that such bearings and spacers be castings, or otherwise machining operations to produce the necessary hollow configuration of such members cannot be avoided.

In accordance with this invention, the maximum unit blade loading is obtained in a harrow by incorporating the greatest portion of the weight of the harrow in a massive transverse frame member which directly overlies the disc harrow gangs. In accordance with the preferred modification of this invention, such frame member comprises a solid bar bent into an angular configuration corresponding to the working angle of the disc gangs. In another modification of this invention, such transverse frame member constitutes a straight solid bar which is disposed as nearly as possible to directly overlie both of the disc gangs. By incorporating most of the weight of the harrow in such transverse frame members, weight may be built into the harrow at minimum manufacturing cost since these particular shapes are the most economical way of incorporating weight into a harrow design. Furthermore, the disposition of such frame members relative to the discs is such that almost all of the weight of the harrow frame is effective in producing loading of the discs and little, if any, of the harrow weight is carried by the tractor hitch links when the harrow is operating.

In Figs. 1 and 4 there is shown a preferred modification of an improved disc harrow constructed in accordance with this invention. Such harrow comprises a frame 10 having a main transverse frame member 11 of solid bar stock bent into an angular or V-construction corresponding to the desired working angle of a pair of disc gangs 15 which are mounted beneath such bar as will be later described. The ends 11a of member 11 are squared off perpendicular to the axes of such ends and a pair of depending plate-like arms 12 are respectively conveniently secured by welding to the squared off ends 11a of bar 11. Depending arms 12 are utilized to support the outer ends of the pair of disc gangs 15. Each disc gang 15 comprises the usual disc blades 15a mounted in axially spaced relationship by suitable spacers 15b on a shaft or gang bolt 20. Adjacent the ends of each gang bolt 20, a bearing 21 is provided which surrounds the end portions of each of such gang bolts. Bosses 21a are provided on each of the bearings 21 and a pair of vertically disposed bolts 21b in such bosses secure the bearings caps of bearing 21 about the gang bolt 20 in a well known manner and such bolts likewise secure an angle lug 22 to the top of each boss 21a.

Depending arms 12 are respectively welded at their lower ends to the angle lugs 22 provided on the outermost ends of disc gangs 15. A pair of vertical depending arms 23, which also comprise plate-like members, are respectively welded at their upper ends to the underside of bar member 11 on opposite sides of the vertex 11c. The lower ends of arms 23 are respectively welded to the innermost angle lugs 22 provided on the inner bearings 21 of the disc gangs 15.

A horizontally disposed, substantially U-shaped bracket 13 is provided having rearwardly diverging arms 13a which are respectively welded to a medial portion of the depending arms 12. Such arms diverge somewhat as shown in Fig. 4 to facilitate securing the ends thereof to the depending arms 12. The bight portion 13b of bracket 13 is forwardly facing as best shown in Figs. 1 and 2. A pair of transversely spaced angle lugs 14 are welded to the forwardly facing bight portion 13b of bracket 13 as best shown in Fig. 4. Each of lugs 14 is suitably apertured to transversely support a rod 16.

A so-called A-frame 17 is provided, comprising a pair of upwardly sloping arms 17a. Each of the arms 17a has a bottom vertical portion 17b suitably transversely apertured which respectively pivotally mount such ends on rod 16 adjacent the inside faces of lugs 14. Arms 17 slope upwardly and terminate in upstanding vertical portions 17c which are laterally spaced apart by washer-like spacers 17d mounted on a bolt 18a. The forward end of a rearwardly and downwardly projecting brace link 18 is pivotally mounted on transverse bolt 18a between spacers 17d. The other end of link 18 is connected to a vertical plate-like lug 11b welded to the top of the vertex 11c of the V-shaped bar member 11. A plurality of transverse holes 18b are provided in longitudinally spaced relationship on the lower end of link 18 whereby such link may be secured to lug 11b by a bolt 19 traversing a selected hole 18b. Thus the effective length of brace link 18 may be varied.

Disc gangs 15 are mounted directly underneath the transverse bar member 11 as heretofore described so as to conform to the V-shaped configuration of the V-shaped transverse bar 11 and thereby define the working angle of the gangs. The primary purpose, however, for so shaping transverse bar member 11 is to dispose the relatively large mass of bar 11 directly over the disc gangs 15 so that the maximum loading per disc may be obtained to insure optimum penetration of the disc gangs. The bar 11 is purposely made so massive that the combined weight of the disc gangs and such bar constitutes substantially all the mass of the harrow. Hence, a minimum of weight is supported by the tractor hitch links and substantially all of the harrow mass functions to load the discs.

There will now be described a modification of the improved disc harrow which is best illustrated in Fig. 2. In such modification, substantially all of the elements utilized in the preferred modification of this invention are again employed. The only substantial difference between the two constructions is the utilization of a straight transverse bar member 35 as the main frame bar in place of the V-shaped bar 11. The ends of transverse bar 35 are angularly cut relative to the axis thereof so that depending plate-like arms 12 may be welded thereto to dispose such arms at an angle to angularly dispose disc gangs 15 relative to bar member 35. Depending arms 12 support the outer ends of disc gangs 15 in the same manner as described for the preferred modification of this invention. The inner ends of disc gangs 15, however, are supported by a pair of rearwardly and downwardly sloping diverging arms 36. Arms 36 are suitably angled and curved at their upper ends to snugly abut the transverse bar 35 to which they are secured by welding. The lower ends of arm 36 are welded to the inner angle lugs 22 provided on disc gangs 15 to maintain the disc gangs 15 in a V-shaped arrangement corresponding to the desired working angle of such disc gangs.

A plate-like lug 35a is secured by welding to the upper central transverse bar 35. A-frame 17 mounted on rod 16 is transversely supported by the spaced angle lugs 14 secured to bracket 13, which in turn is secured to depending arms 12, as described for the preferred modification. A brace link 37 connects the top of A-frame 17 with a lug 35a on bar 35. Link 37 is substantially the same as link 18, however, due to the straight configuration of transverse bar 35, such link will be substantially shorter. Link 37 is secured at its upper end to the spaced apart end portion 17c of A-frame 17 by a transverse bolt 38. The lower end of link 37 has a plurality of longitudinally spaced transverse holes 37b and such end of the link is secured to lug 35a in a selected position of adjustment by a transverse bolt 39. As was previously mentioned, with the exception of the transverse bar 35, arms 36 and link 37, all of the other elements of the harrow are identical to the frame structure previously described for the preferred modification, hence further description thereof is not believed necessary. The large mass of transverse bar 35 while not disposed as directly over disc gangs 15, does however, substantially overlie the gangs so that maximum weight loading per disc is again obtained.

Both modifications of the improved disc harrow of this invention are preferably utilized with a tractor 24 of well known make having a pair of laterally spaced draft links 25 pivoted to the rear axle housing 26 as at 27. The trailing ends of draft links 25 are provided with a universally swiveling spherical joint connection 25a which are respectively mountable on the ends of rod 16. A suitable linch pin 28 secures the draft links 25 when mounted on rod 16 against displacement. Draft links 25 are vertically raised by a pair of transversely spaced rocker arms 29 secured to the ends of a rock shaft 30 mounted on top of the tractor transmission housing. The ends of rocker arms 29 are respectively connected to a pair of links 31 which are in turn connected to a medial portion of draft links 25 whereby draft links 25 are lifted. A top link 32 is pivotally connected at its forward end to a lug member 33 provided on top of axle housing 26 while the rear end of top link 32 is pivotally connected between the upstanding end portions 17c of arm 17 by a transverse pin or bolt 34. Rocker arms 29 are rotated by a built-in hydraulic mechanism (not shown) and such mechanism is controlled by a manually operated hydraulic control lever, also not shown. Thus by manipulation of such lever the tractor operator can easily and conveniently raise or lower draft links 25 to raise the harrow to a transporting position or lower them and a connected implement to a ground engaging position.

For level discing the brace links 18 (or 37) of the improved disc harrow is positioned as shown in Fig. 1. In such figure the disc gangs 15 are in a substantially horizontal plane and hence an even discing may be readily obtained. However, if it is desired to position the gangs so that a shallow ditching effect may be obtained, it is merely necessary to effect lengthening of brace link 18 (or 37) by inserting bolt 19 through any one of the more rearwardly displaced holes 18b (or 37b). The effect of lengthening link 18 (or 37) is to increase the angular relationship between the A-frame 17 and the main frame members 11 (or 35). When this is accomplished, the vertex of the V-disposed gangs 15 will then be positioned at a lower elevation than the outer ends of disc gangs 15 whereupon the inner discs 15a will then bite more deeply into the ground than will the outer discs and thus a V-shaped ditch or furrow will be produced. Conversely, by shortening link 18 (or 37) within the limits of the spaced holes 18b (or 37b) provided on such link, a ridging effect can be obtained as the vertex of the gangs will be raised, whereupon the outer discs will be positioned lower than the inner discs.

From the above description, it is clearly apparent that there is here provided an improved disc harrow having an unusually rugged simplified frame construction which effects a substantial saving in the manufacturing cost. A more important consideration, however, is the weight distribution afforded by such frame. The main frame member of this improved disc harrow being of heavy bar stock and disposed substantially above the disc gangs insures an optimum penetration of the discs. The massive main frame member eliminates the use of extra heavy castings for disc spacers and bearing members, which are generally resorted to in adding weight to the harrow, hence important savings in material cost are thus realized. Furthermore, while providing a desirable weight loading per disc, the total weight of the harrow will not exceed the maximum load carrying capacity of the power operated trailing hitch links of a tractor of well known make with which this improved disc harrow is preferably utilized.

In addition, this improved disc harrow has a multiplicity of uses including the forming of ditches or ridges. Furthermore, this harrow is readily transported to and from the working area by the power-lifted, trailing draft links of any tractor equipped with such draft links, thereby preventing damage to the disc blades. The sturdy and rugged construction of the welded rigid frame insures long, trouble-free life of this improved disc harrow.

It will, of course, be understood that various details of construction may be varied through a wide range without departing from the principles of this invention and it is, therefore, not the purpose to limit the patent granted hereon otherwise than necessitated by the scope of the appended claims.

I claim:

1. For use with a tractor having a pair of power-lifted, trailing hitch links and a top link, a disc harrow comprising a transverse bar, a pair of first plates respectively secured to the ends of said bar in depending relation, a pair of second plates secured to the medial portions of said bar in depending relation, a pair of disc gangs respectively journaled between said first and second plates, whereby said bar overlies said disc gangs, a horizontally disposed substantially U-shaped bracket having its arms secured to said first plates, an A-frame, means on said U-shaped bracket for pivotally mounting said A-frame thereto in transversely disposed, upstanding relationship, said A-frame being adapted for connection at its bottom portion to the tractor hitch links and at its upper portion to the tractor top link, and adjustable length brace means connecting said A-frame structure to said bar, thereby permitting variation of the vertical tilt of said disc gangs with respect to the ground.

2. For use with a tractor having a pair of power-lifted, trailing hitch links and a top link, a disc harrow comprising a transverse bar of V-shaped configuration in a horizontal plane, the angle of such configuration corresponding to the desired working angle of the disc gangs, the end faces of said bar being respectively squared off substantially perpendicular to the longitudinal axes of the bar ends, a pair of first plates respectively disposed in abutting relationship to said bar end faces and welded thereto with said first plates depending from said bar, a pair of second plates secured to the medial portions of said bar in depending relation, a pair of disc gangs respectively journaled between said first and second plates, whereby said frame bar directly overlies said disc gangs, a horizontally disposed substantially U-shaped bracket having its arms secured to said first plates, a pair of laterally spaced lugs on the bight portion of said U-shaped bracket being constructed and arranged to transversely support a rod member, an A-frame pivotally mounted on said rod member, said A-frame being connected at its bottom portion to the tractor hitch links and at its upper portion to the top link, and adjustable length brace means connecting said A-frame structure to said bar, thereby permitting variation of the vertical tilt of said disc gangs with respect to the ground, said bar and said disc gangs being proportioned to constitute substantially all the mass of the harrow, whereby substantially all of the harrow weight is effectively applied as loading to said disc gangs.

FREDERICK D. SAWYER.

References Cited in the file of this patent

UNITED STATES PATENTS

| Number | Name | Date |
|---|---|---|
| 654,243 | Gatling | July 24, 1900 |
| 1,669,935 | Graham | May 15, 1928 |
| 1,701,665 | Deines | Feb. 12, 1929 |
| 2,456,693 | Fraga | Dec. 21, 1948 |

FOREIGN PATENTS

| Number | Country | Date |
|---|---|---|
| 301,207 | Great Britain | Nov. 29, 1928 |